United States Patent [19]

Stecker

[11] Patent Number: 5,166,230
[45] Date of Patent: Nov. 24, 1992

[54] METHOD FOR PRODUCING A SYNTHETIC SHAPED ARTICLE SIMULATING MARBLE, GRANITE OR THE LIKE

[76] Inventor: William M. Stecker, 513 Twin Elms, Chapel Hill, N.C. 27514

[21] Appl. No.: 760,743

[22] Filed: Sep. 16, 1991

[51] Int. Cl.$^5$ .............................................. C08L 67/06
[52] U.S. Cl. .................................... 523/500; 523/523; 523/171; 521/48; 525/437; 528/271; 528/274; 528/502
[58] Field of Search ................. 523/500, 523, 171; 521/48; 528/271, 274, 502; 525/437

[56] References Cited

U.S. PATENT DOCUMENTS

| | | |
|---|---|---|
| 2,265,226 | 12/1941 | Clewell . |
| 2,761,176 | 9/1956 | Welch et al. . |
| 2,775,994 | 1/1957 | Rowe . |
| 2,917,780 | 12/1959 | Petry . |
| 3,315,019 | 4/1967 | Fischler . |
| 3,341,396 | 1/1967 | Iverson . |
| 3,396,067 | 8/1968 | Schafer . |
| 3,562,379 | 2/1971 | Duggins . |
| 3,687,793 | 8/1972 | Bright . |
| 3,692,892 | 9/1972 | Lemelson . |
| 3,700,752 | 10/1972 | Hutchinson . |
| 3,761,555 | 9/1973 | Weinand et al. . |
| 3,906,065 | 9/1975 | Schneider et al. . |
| 4,062,826 | 12/1977 | Hutchinson et al. . |
| 4,137,215 | 1/1979 | Van Gasse . |
| 4,159,301 | 6/1979 | Buser et al. . |
| 4,188,316 | 2/1980 | Sawada . |
| 4,277,570 | 7/1981 | Michel ............................ 525/437 |
| 4,304,878 | 12/1981 | Howell . |
| 4,343,752 | 8/1982 | Cann . |
| 4,413,072 | 11/1983 | Hess et al. ....................... 523/500 |
| 4,433,070 | 2/1984 | Ross et al. . |
| 4,544,584 | 10/1985 | Ross et al. . |
| 4,814,220 | 3/1989 | Brathwaite . |
| 4,818,570 | 4/1989 | Milles . |
| 4,829,103 | 5/1989 | Oda et al. ......................... 523/171 |
| 4,873,274 | 10/1989 | Cummings et al. ............ 523/500 |
| 4,892,764 | 1/1990 | Drain et al. . |
| 4,923,658 | 5/1990 | Hover et al. . |
| 4,959,401 | 9/1990 | Bellasalma et al. . |
| 5,055,324 | 9/1991 | Stecker . |

FOREIGN PATENT DOCUMENTS

| | | |
|---|---|---|
| 625175 | 7/1955 | Canada . |
| 1221781 | 6/1966 | Fed. Rep. of Germany . |
| 0217664 | 12/1984 | Japan ................................ 523/171 |
| 874759 | 7/1957 | United Kingdom . |
| 1174952 | 12/1969 | United Kingdom . |
| 2151906A | 7/1985 | United Kingdom . |

*Primary Examiner*—Paul R. Michl
*Assistant Examiner*—Olga Asinovsky
*Attorney, Agent, or Firm*—Bell, Seltzer, Park & Gibson

[57] ABSTRACT

A method for producing synthetic shaped articles simulating marble, granite or the like is provided by the present invention. A thermosetting resin is subjected to first reaction conditions effective to partially polymerize the resin to form a semi-solid mass. The partially polymerized semi-solid mass of resin is comminuted to form a plurality of discrete partially polymerized resin particles. An article of the desired shape is formed from a mass of the partially polymerized resin particles. The thus formed shaped article is then subjected to second chemical reaction conditions effective to polymerize the resin to provide a synthetic shaped article simulating marble, granite and the like.

30 Claims, 3 Drawing Sheets

METHOD FOR PRODUCING A SYNTHETIC SHAPED ARTICLE SIMULATING MARBLE, GRANITE OR THE LIKE

FIELD AND BACKGROUND OF THE INVENTION

This invention relates to a synthetic shaped article and its method of preparation. Particularly, this invention relates to a synthetic shaped article which simulates marble, granite or the like, and its method of preparation.

Simulated marble, granite or other simulated stone surfaces have become a popular building material. Articles made from these materials include architectural facings, exterior and internal wall panels, light fixtures, bathroom fixtures, counter tops, table tops, floors and other articles for which real stone is used. As compared to natural marble or granite, simulated marble or granite is less expensive, lighter, not as easily chipped, and has a greater uniformity of particle size, type and color.

Various techniques for forming simulated marble or granite are known. For example, U.S. Pat. No. 3,341,396 to Iverson proposes an "outmold" casting technique comprising applying a pigmented coating of a thermosetting resin to a substrate (e.g., wood, brick, etc.), followed by applying a base layer having a color pigment, and then applying a transparent coating layer on top of the color pigmented base layer. U.S. Pat. Nos. 4,433,070 and 4,544,584 to Ross et al propose "inmold" casting techniques comprising forming a cultured marble or like mineral appearance surface by introducing a first resin hardened to a predetermined hardness and distributing it in a second liquid resin. U.S. Pat. No. 4,959,401 to Bellasalma et al proposes another inmold casting technique using a thermoset portion and an inorganic particulate portion of naturally occurring minerals.

These prior techniques for forming simulated stone have several disadvantages. If inorganic particles are used, the simulated stone often has weak areas at the boundaries where the inorganic particles and the resin contact each other. This results in a susceptibility to uneven cracking along the contours of the inorganic particles. This limits the ability to widely use the article particularly when the article is susceptible to being cracked from exertion of external forces. Moreover, the ability to create different and aesthetically pleasing patterns using these techniques is also limited.

A solution to the aesthetic problem is proposed in U.S. Pat. No. 4,818,570 and U.K. Patent No. 2,151,906 both to Milles. These patents propose forming an amorphous simulated stone-like material by mixing a resin, an inorganic filler and pigment to form a paste having a high viscosity which is cut into pieces, coated with additional pigment to create the desired aesthetic effect, and recombined under pressure. The resulting stone-like material, however, may have weak areas at the boundaries where the resin and filler and resin and pigment are in contact with each other.

Accordingly, it would be desirable to provide a method of producing a synthetic shaped article simulating marble, granite or the like which is strong, is relatively free of weak areas, and permits the production of different and aesthetically pleasing patterns.

SUMMARY OF THE INVENTION

A method for producing a synthetic shaped article simulating marble, granite or the like is provided. A thermosetting resin is subjected to first chemical reaction conditions effective to partially polymerize the thermosetting resin to form a semi-solid resin mass (i.e., a mass which resists cold flow at ambient temperature). Preferably, the semi-solid mass has a Shore A hardness of from about 2 to about 50. The partially cured semi-solid resin mass is comminuted (e.g., cut, divided, etc.) to form a plurality of discrete partially polymerized resin particles. An article of the desired shape is then formed from a mass of the partially polymerized resin particles (i.e., the particles are reassembled). The thus formed shaped article is subjected to second reaction conditions effective to fully polymerize the thermosetting resin to provide the synthetic shaped article simulating marble, granite and the like.

Generally, polymerization of thermosetting resins can occur in two different ways. Polymerization can be an addition reaction in which free radical curing agents react with the double bonds of the monomer and the thermosetting resin to effect curing or polymerization. Polymerization can also occur by a condensation reaction and by so-called oxidative coupling to effect polymerization.

In a preferred embodiment, a resin system including a thermosetting resin, a first chemical reaction agent (e.g., a first curing agent) and a second reaction agent (e.g., a second curing agent) is provided. Preferably, the first curing agent has a relatively low activation energy and the second curing agent has a relatively high activation energy. The resin system is subjected to first chemical reaction conditions effective to activate only the first curing agent. For example, if the first curing agent has a low activation energy (i.e., it will activate at temperatures of less than about 50° C. and preferably at temperatures from about 20° C. to about 40° C.), the first chemical reaction conditions can be subjecting the resin system to ambient temperature or slightly higher than ambient temperature Activation of the first curing agent partially cures or polymerizes the resin system to form the semi-solid resin mass. The partially cured semi-solid resin mass is comminuted to form a plurality of discrete partially cured resin particles. An article of the desired shape is then formed from a mass of the partially cured resin particles. The thus formed shaped article is subjected to second chemical reaction conditions effective to activate the second curing agent and to fully cure or polymerize the resin to provide the synthetic shaped article. For example, if the second curing agent has a relatively high activation energy (i.e., it will activate at temperatures greater than about 70° C.), the second chemical reaction conditions can be subjecting the shaped article to a temperature of greater than about ambient temperature, and sometimes greater than about 70° C. while applying a pressure, preferably of at least about 50 psi.

In another embodiment, the resin system is subjected to the first curing conditions as described previously; however, the partially cured semi-solid resin mass is comminuted and cooled to arrest further curing. An article of the desired shape is then formed from the mass of the partially cured particles, and the article is subjected to second chemical reaction conditions effective to activate the second curing agent and to fully cure or polymerize the resin system to provide the synthetic shaped article. Alternatively, in this embodiment, a single first curing agent can be used, with the second chemical reaction conditions reactivating the first curing agent. The second chemical reaction conditions can be subjecting the shaped article to ambient temperature and above, preferably while applying pressure.

In another embodiment, a resin system including at least two reacting components (e.g., monomers) is provided. The first chemical reaction conditions can be conditions effective to partially polymerize the resin by a chain extension reaction (e.g., a condensation reaction) to form the semi-solid resin mass. The semi-solid resin mass is comminuted to form a plurality of discrete resin particles. An article of the desired shape is then formed and the thusly shaped article is subjected to second chemical reaction condition effective to fully cure or polymerize the resin. For example, a free radical curing agent can be included in the thermosetting resin and the second chemical reaction conditions can be activating the free radical curing agent.

The control of the cure rate and the comminuting of the partially cured resin particles results in an article which has improved strength properties. Particularly, the article is resistant to cracks in that a homogenous, non-amorphous material with substantially no physical or chemical boundaries between the reassembled resin particles and between any filler and resin are formed. The article, however, can be provided with pleasing and predetermined aesthetic properties. Namely, the appearance of sharp edges or break lines between the resin particles which closely simulate real marble of granite can be formed. Additionally if actual fissures are desired, the cure rate and conditions can be controlled to allow this. Exemplary shaped articles produced by the methods of the present invention include architectural facing, exterior and interior wall panels, light fixtures, bathroom fixtures, counter tops, table tops, three-dimensional molded articles (e.g., architectural amenities, food trays, desk accessories, objets d'art, etc.) and the like.

DETAILED DESCRIPTION OF THE PREFERRED EMBODIMENTS

Figure 1:
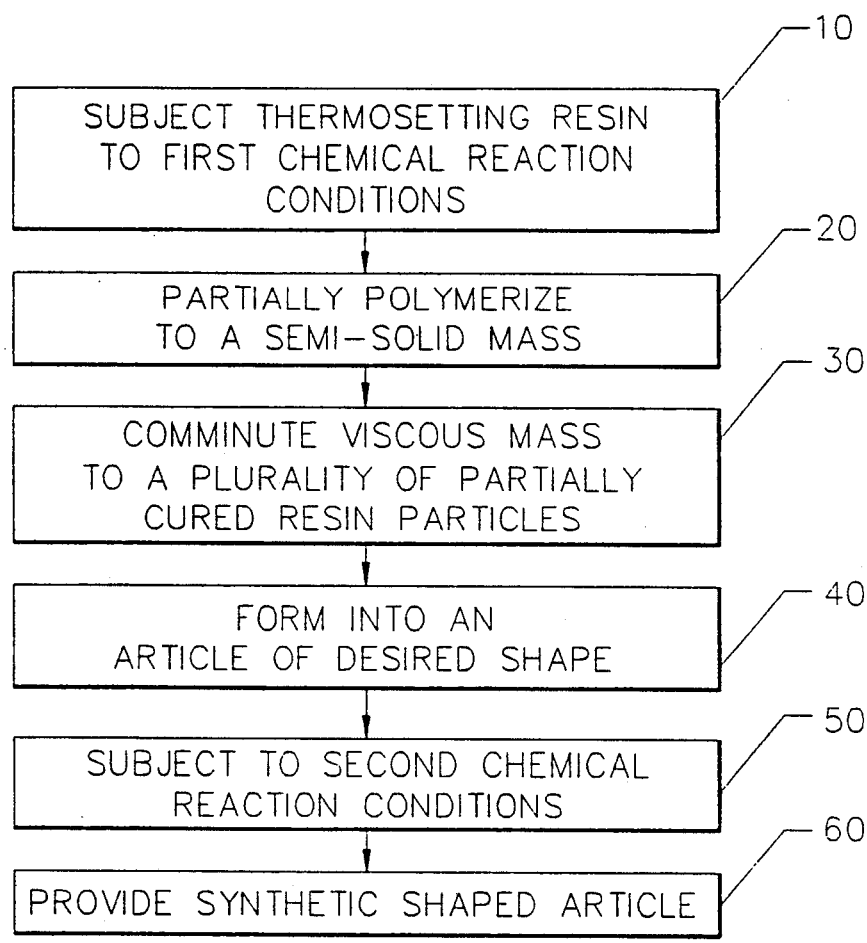
FIG. 1 is a schematic diagram of method steps representative of an embodiment of the present invention.

The present invention relates to a method of providing a shaped article simulating marble, granite or the like which has improved strength properties and pleasing aesthetic properties. Referring to FIG. 1, the shaped article is provided by a method which includes subjecting 10 a resin to first chemical reaction conditions effective to partially polymerize 20 the thermosetting resin to form a semi-solid mass. For purposes of this invention, the term "semi-solid mass" relates to polymerizing the resin to a Shore A hardness of from about 2 to about 50 and preferably a Shore A hardness of from about 5 to about 10. Such a semi-solid mass resists cold flow under ambient temperature and pressure conditions and has sufficient green strength to maintain its physical integrity. The partially cured semi-solid mass is then comminuted 30 to form a plurality of discrete partially polymerized resin particles.

An article of the desired shape is formed 40 from a mass of the partially polymerized resin particles. The thus formed article is then subjected 50 to second chemical reaction conditions effective to fully polymerize the thermosetting resin to provide 60 a synthetic shaped article simulating marble, granite and the like. The chemical reaction conditions are generally polymerization reactions involving the reaction of chemical reaction agents. Namely, the first reaction conditions effective to partially polymerize the resin include activating a first chemical reaction agent, and the second chemical reaction conditions effective to fully polymerize the thermosetting resin include activating the second chemical reaction agent.

Figure 2:
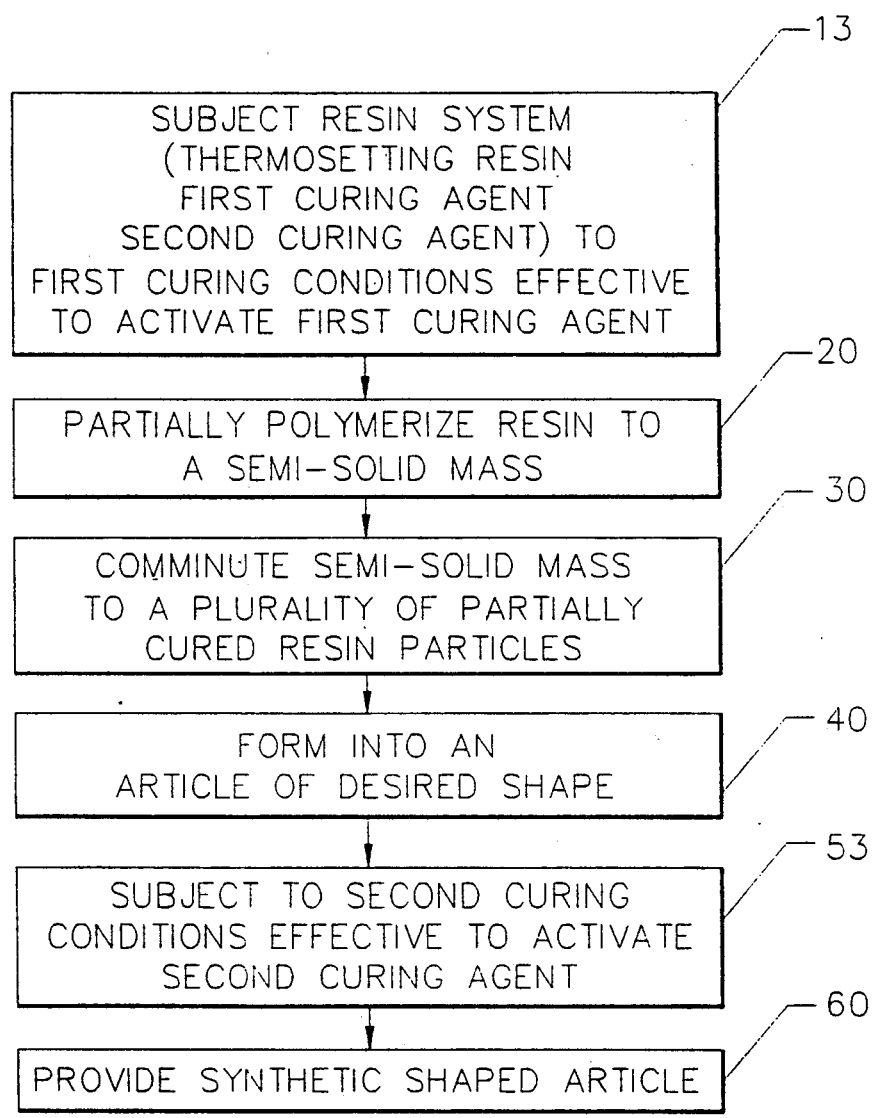
FIG. 2 is a schematic diagram of method steps representative of an embodiment of the present invention utilizing a resin system including a thermosetting resin, a first curing agent and a second curing agent.

Generally, polymerization can be an addition reaction (e.g., using free radical curing agents) or a condensation reaction (e.g., using a chain extension reaction). Referring to FIG. 2, an embodiment using an addition reaction is illustrated, with like numerals indicating aspects common to those in FIG. 1. A resin system (i.e., a thermosetting resin, a first curing agent and a second curing agent) is subjected 13 to first curing conditions effective to activate the first curing agent and to partially polymerize 20 the resin to form the semi-solid mass. The first curing agent typically has a low activation energy and the second curing agent has a high activation energy relative to each other. Thus, the first curing conditions effective to activate only the first curing agent can be subjecting the resin system to a low activation energy (i.e., to ambient temperature, e.g., a temperature less than 50° C. and preferably about 20° C. to about 40° C., at ambient pressure).

The first curing agent and first curing conditions are selected to permit the semi-solid mass to remain in the semi-solid state for an extended period, or the first curing agent can be selected so that comminuting is substantially contemporaneous with curing. Additionally, further curing can be arrested to maintain the resin system in the partially cured state. For example, the step of arresting can include cooling the resin system to a temperature of less than about 15° C., often less than 5° C., and sometimes less than about 0° C. The selection of the period of time during which comminuting can take place is within the skill of one in the art.

The partially cured semi-solid mass is then comminuted 30 to form a plurality of discrete partially polymerized resin particles. An article of the desired shape is formed 40 from a mass of the partially polymerized resin particles. The thus formed article is then subjected 53 to second chemical reaction conditions effective to activate the second curing agent and to fully polymerize the thermosetting resin to provide 60 the synthetic shaped article. Preferably, the second curing conditions include subjecting the resin system to a high activation energy, namely temperatures of greater than about ambient temperature, and sometimes greater than about 70° C. to fully cure or polymerize the resin system. Other means for activating the second curing agent such as radiation (e.g., an electron beam) will be known to those skilled in the art.

Figure 3:
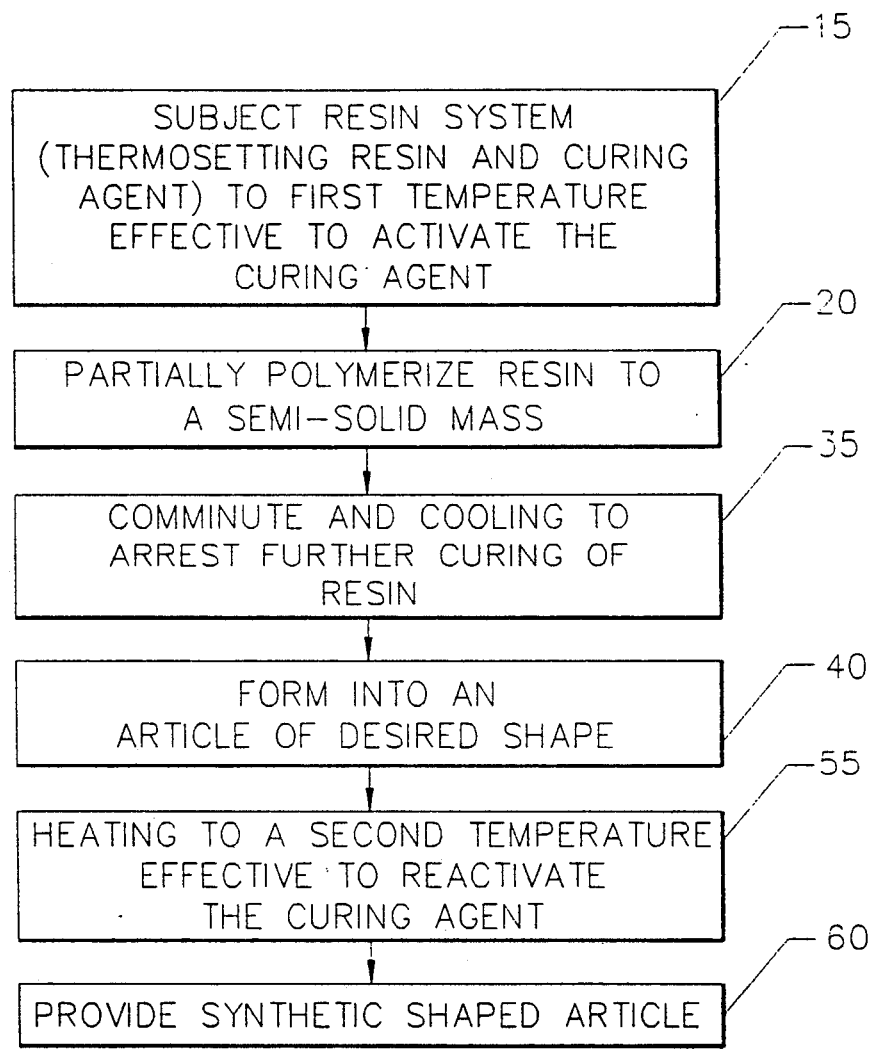
FIG. 3 is a schematic diagram of method steps representative of an embodiment of the present invention utilizing cooling to arrest further curing.

Referring to FIG. 3, another embodiment of the present invention is illustrated with like numerals indicating aspects common to FIGS. 1 and 2. A resin system (i.e., a thermosetting resin and curing agent) is subjected 15 to first curing conditions effective to activate the first curing agent and to partially polymerize 20 the resin to form the semi-solid mass. The resin system is subjected 15 to a first temperature (i.e., to ambient temperature, e.g., a temperature less than 50° C. and preferably about 20° C. to about 40° C., at ambient pressure). The semi-solid mass is comminuted and cooled 35, preferably to a temperature less than about 15° C., often less than about 5° C. and sometimes less than about 0° C., to arrest further curing of the resin. Other means for arresting or deenergizing the cure, for example the use of a minimum amount of first curing agent) will be known to those skilled in the art. An article of the desired shape is then formed 40. The article is heated 55 to a second temperature (e.g., a temperature of at least ambient and above) effective to reactivate the first curing agent, thereby fully curing the resin system to provide 60 the synthetic shaped article. Preferably, the curing agents in this embodiment are hydrogen peroxide and methyl ethyl ketone peroxide.

The semi-solid mass can be comminuted by various methods such as slicing, crushing, grating, stamping, extruding, sectioning or the like to form a plurality of discrete partially cured resin particles the size of which can vary depending on the end aesthetic appearance desired. For example, if a random crushed granite appearance is desired, the semi-solid mass can be crushed between two waffled surfaces to form fragments from about 1/16 inch to about 1 inch in size. If a patterned configuration (e.g., a checkerboard) is desired, the semi-solid mass can be sliced into blocks of predetermined dimensions and then placed in the patterned configuration. In another embodiment, multiple partially cured particles can be formed having different aesthetic characteristics (e.g., colors) and then combined together. An additional thermosetting resin can be blended, coated or otherwise added to the partially cured resin, to act as a lubricant to facilitate molding such as when an extrusion technique is used or to improve aesthetics. The additional resin can be the original resin or can be a different resin, and typically is about 2 to 20 percent by weight of the original resin.

After comminuting, the plurality of discrete partially cured resin particles are formed into an article of the desired shape preferably by placing the particles in a mold and molding (i.e., compression molding). Typically, a pressure of greater than about 50 psi, typically greater than 100 psi and often greater than 250 psi is applied to the mold while subjecting the shaped article to second reaction for fully curing the resin. Additionally the use of other forming techniques such as extrusion, injection molding, and the like is within the skill of one in the art.

Exemplary shaped articles produced by the various methods of the present invention include architectural facing, exterior and interior wall panels, light fixtures, bathroom fixtures, counter tops, table tops, three-dimensional molded articles (e.g., architectural amenities, food trays, desk accessories, objets d'art, etc.) and the like. The resulting article is aesthetically pleasing with the appearance of sharp break lines and edges simulating real marble or granite, has sufficient hardness (i.e., a Barcol hardness of greater than 40, often greater than 50 and sometimes greater than 60), flexibility, impact strength and flex strength. The article has a fissured or veined look but the article is chemically and physically homogeneous and non-amorphous. For example, if the article is cracked it will start to crack independently of any pattern of resin particles, added filler, or the like, generally along a substantially straight line, rather than following a pattern of the resin particles or any added filler or the like (e.g., an irregular crack). On the other hand, if actual faults or fissure are desired, for aesthetic reasons, the same can be accomplished by adjusting the pressure of molding and cure conditions.

The thermosetting resins useful herein can vary and include unsaturated polyesters, phenolics, epoxies, polyurethanes, and the like, and mixtures and blends thereof. By the term "thermosetting", it is meant that the resin irreversibly solidifies or "sets" when completely cured by activating the curing agents.

The unsaturated polyester resins are a particularly preferred resin. Useful unsaturated polyester resins include practically any esterification product of a polybasic organic acid and a polyhydric alcohol, wherein either the acid or the alcohol, or both, provide the ethylenic unsaturation. Typical unsaturated polyesters are those thermosetting resins made from the esterification of a dihydric alcohol with an ethylenically unsaturated dicarboxylic acid. Examples of useful ethylenically unsaturated polycarboxylic acids include maleic acid, fumaric acid, itaconic acid, dihydromuconic acid, and halo and alkyl derivatives of such acids and anhydrides, and mixtures thereof. Exemplary polyhydric alcohols include saturated polyhydric alcohols such as ethylene glycol, 1,3-propanediol, propylene glycol, 2,3-butanediol, 1,4-butanediol, 2-ethylbutane-1,4-diol, 1,5-pentanediol, 1,6-hexanediol, 1,7-heptanediol, 1,8-octanediol, 1,9-nonanediol, 1,10-decanediol, 2,10-decanediol, 1,4-cyclohexanediol, 1,4-dimethylolcyclohexane, 2,2-diethylpropane-1,3-diol, 2,2-dimethylpropane-1,3-diol, 3-methylpentane-1,4-diol, 2,2-diethylbutane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

Unsaturated polyester resins can also be derived from the esterification of a saturated polycarboxylic acid or anhydride with an unsaturated polyhydric alcohol. Examples of useful saturated polycarboxylic acids include oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebaccic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Useful unsaturated polyhydric alcohols for reacting with the saturated polycarboxylic acids include ethylenic unsaturation-containing analogs of the above saturated alcohols (e.g., 2-butene-1,4-diol). The unsaturated polyester resins are generally crosslinked with a compatible crosslinking monomer such as styrene, vinyl toluene, methyl methacrylate, methyl styrene, divinyl benzene, diallyl phthalate and the like.

The amount of polyester thermosetting resin in the resin system ranges from about 35 percent to about 90 percent by weight of the total resin system. The amount of crosslinking monomer is about 10 percent to about 65 percent by weight of the resin system.

A particularly suitable polyester thermosetting resin is a mixture of 85 percent by weight of PolyLite ® 32160 polyester resin and 15 percent by weight of PolyLite ® 31830 polyester resin, both available from Reichhold Chemical Company, Research Triangle Park, N.C.

The polyester resin can also be mixed or blended with other thermosetting resins. For example, the polyester resin can be mixed with a crosslinkable polyurethane such as described in U.S. Pat. No. 4,062,826 to Hutchinson et al, the disclosure of which is incorporated herein by reference. Polymerization of this mixture can occur by a condensation reaction. A homogenous mixture of an unsaturated polyester resin and a crosslinkable polyurethane precursor having at least one free isocyanate group to react with the end groups of the polyester resin is formed. For example, a crosslinkable polyurethane comprising at least one polyfunctional compound containing groups reactive with isocyanate groups and at least one polyisocyanate can be used. The isocyanate is activated by the first reaction conditions and the chain extension reaction takes place to partially polymerize the resin blend to a semi-solid mass. Exemplary polyisocyanates include methylene di-p-phenylene isocyanate ("MDI") isophorone diisocyanate ("IPDI") and toluene diisocyanate ("TDI"). The second reaction conditions can be activating additional polyisocyanate to fully polymerize the resin blend or can be activating a free radical initiator in the blend to fully polymerize the same. The use of other thermosetting resins will be within the skill of one in the art.

An exemplary class of first curing agents having a low activation energy are the low temperature, so-called "room temperature", free radical initiators. Exemplary room temperature free radical initiators include hydrogen peroxide and methyl ethyl ketone peroxide ("MEKP") noting that most commercially available MEKP includes some hydrogen peroxide.

The second curing agent can also be a free radical initiator, but preferably is an initiator that activates on exposure to high amounts of energy (i.e., one having a high activation energy), namely temperatures greater than ambient temperature, and preferably greater than about 70° C. and often greater than about 150° C. Exemplary free radical initiators of this type are also peroxy-type free radical polymerization initiators. Examples are the hydroperoxides such as tert-butyl hydroperoxide, 2,5-dimethylhexane-2,5-dihydroperoxide, cumene hydroperoxide, para-methane hydroperoxide and the like; peroxy esters such as di-tert-butyl peroxide, dibenzyl peroxide and the like; ketone peroxides such as methyl ethyl ketone peroxide, cyclohexanone peroxide and the like; acyl peroxides such as benzoyl peroxide, parachlorobenzoyl peroxide; 2,4-dichlorobenzoyl peroxide, lauroyl peroxide and the like. Also azo promoters such as azobisbutrylnitrile can be used. The amount of first and second curing agents used is dependent on the time desired for thermosetting, but is typically a short period of time (i.e., less than 3 hours, typically less than 2 hours and often less than 1 hour). The amount used is about 0.01 to about 0.1 percent by weight of the first curing agent and about 0.1 to about 5 percent by weight of the second curing agent.

The resin system can also include various additives commonly employed in thermosetting resin compositions such as fillers, colorants, veining pigments, thixotropic agents, chemical thickening agents, mold release agents, low profile additives and other additives for imparting desirable properties such as hardness, color, flame retardancy, aesthetic appearance, smoothness, clarity and the like.

Exemplary fillers can include, among others, alumina trihydrate, quartz powder, marble powder, crushed silica, calcium carbonate, clay, glass fibers, mixtures thereof and other mineral and inorganic particulates that contribute to the aesthetics of the final article. The fillers are used in amounts of about 20 to about 300 percent by weight.

Various colorants and veining pigments can be added for purposes of providing background color and other aesthetically pleasing features to the resin system and shaped article. For example, tinting pigments such as titanium dioxide and the like can be added or a trace amount of carbon black can be swirled in to contribute to the marble-like appearance. The amount used is typically less than about 1 percent by weight.

Thixotropic agents are agents which cause the viscosity of the resin system to vary as a function of its state of agitation and the previous history of motion within the fluid. These agents are preferably used to maintain the filler and other additives in suspension while the resin is curing. Generally, the viscosity of a thixotropic fluid decreases as its state of agitation and length of agitation increases, and increases as its state of agitation and length of agitation decreases. An exemplary thixotropic agents is fumed silica. The amount used is typically less than about 1 percent by weight.

Exemplary chemical thickening agents are hydroxides of metals of Group I, II, and IV of the periodic table such as magnesium oxide, calcium oxide, zinc oxide, magnesium hydroxide, calcium hydroxide, and the like. The thickeners are used in amounts of about 0.5 to about 10 percent by weight, and preferably in amounts of about 1 to about 5 percent by weight.

Exemplary mold release agents include zinc stearate and the like.

Other additives can include flame retardants, antioxidants, inhibitors (e.g., hydroquinone and benzoquinone), UV radiation absorbers and the like.

The present invention and its advantages over the prior art will be more fully understood and appreciated from the illustrative examples which follow. It is to be understood that the examples are for the purpose of illustration and is not intended as being limiting upon the scope of the invention. A person skilled in the applicable arts will appreciate from these examples that this invention can be embodied in many different forms other than as is specifically disclosed.

EXAMPLE 1

A mixture comprising the following is prepared (percents are given by weight based on total weight of resin):

30 percent of a 85/15 mixture of PolyLite ® 32160 and PolyLite ® 31830 isophthalic polyester resins
0.05 percent hydrogen peroxide first curing agent
1.0 percent benzoyl peroxide second curing agent
0.5 percent fumed silica thixotropic agent
1.0 percent zinc stearate mold release agent
0.5 percent titanium oxide pigment
67 percent alumina trihydrate filler The mixture is poured into a container subjected to ambient temperature for 50 minutes and a trace of carbon black is swirled in to contribute to the marble-like appearance. After 50 minutes, the mixture is partially cured and is a substantially solid mass having a Shore A hardness of about 5 to 10.

The semi-solid mass is comminuted to form a plurality of discrete partially cured resin particles having a thickness of about 0.5 to 15 mm.

The discrete partially cured resin particles are placed in a mold having the desired shape of the article to be formed. The mold is closed by a pressure of about 400 psi and the formed shaped article is subjected to a temperature of about 120° C. for three minutes to activate the benzoyl peroxide second curing agent to fully cure the article. The article is demolded and allowed to cool. The article has a granite-like appearance and a Barcol hardness of about 48 to 54.

EXAMPLE 2

The mixture according to Example 1 is prepared. The mixture is poured into a container and subjected to first curing conditions of exposure to ambient temperature for 20 minutes. The mixture is then cooled to less than about 15° C. to arrest further curing while comminuting. After comminuting, the article is then prepared as in Example 1.

The article has a granite-like appearance and a Barcol hardness of about 48 to 54.

That which is claimed is:

1. A method for producing a synthetic shaped article simulating marble, granite or the like, the method comprising:
   (a) providing a thermosetting resin,
   (b) subjecting the thermosetting resin to first chemical reaction conditions effective to partially polymerize the thermosetting resin to form a semi-solid resin mass;
   (c) comminuting the partially polymerized semi-solid mass of thermosetting resin to form a plurality of discrete partially polymerized resin particles;
   (d) forming a shaped article from a mass of the partially polymerized particles; and
   (e) subjecting the thus formed shaped article to second chemical reaction conditions effective to fully polymerize the thermosetting resin to provide a synthetic shaped article simulating marble, granite or the like.

2. The method according to claim 1 wherein the thermosetting resin comprises an unsaturated polyester resin, a first chemical reaction agent and a second chemical reaction agent, and the first chemical reaction conditions effective to partially polymerize the resin include activating the first chemical reaction agent and the second chemical reaction conditions effective to fully polymerize the thermosetting resin include activating the second chemical reaction agent.

3. The method according to claim 2 wherein the first chemical reaction agent is hydrogen peroxide or methyl ethyl ketone peroxide and the second chemical reaction agent is benzoyl peroxide.

4. The method according to claim 2 wherein said first reaction agent is hydrogen peroxide and said step of subjecting the resin system to first chemical reaction conditions effective to activate said first chemical reaction agent comprises subjecting the resin system to ambient temperature at ambient pressure.

5. The method according to claims 2 or 4 wherein said second chemical reaction agent comprises benzoyl peroxide, and said step of subjecting the shaped article to second chemical reaction conditions effective to activate said second chemical reaction agent comprises heating the shaped article under pressure of at least about 50 psi and at a temperature of at least about 70° C.

6. The method according to claim 1 including the step, after said step of subjecting the resin system to first chemical reaction conditions and continuing during said comminuting step, of arresting further polymerization of the resin system to maintain the resin system in a partially polymerized state during comminuting into particles.

7. The method according to claim 6 wherein said arresting step comprises cooling the resin system to less than about 5° C.

8. The method according to claim 1 including the step, after the step of comminuting, of adding additional thermosetting resin to the plurality of discrete partially polymerized cured resin particles.

9. The method according to claim 1 wherein the thermosetting resin is a homogeneous mixture of unsaturated polyester resin and a crosslinkable polyurethane precursor having free isocyanate groups to react with end groups of the polyester resin, and the first reaction conditions are activating the isocyanate and the second reaction conditions are activating a free radical initiator.

10. A method for producing a synthetic shaped article simulating marble, granite or the like, the method comprising:
    (a) providing a resin system including a thermosetting resin, a first curing agent and a second curing agent;
    (b) subjecting the resin system to first curing conditions effective to activate only the first curing agent and thereby partially curing the resin system to form a semi-solid resin mass;
    (c) comminuting the partially cured semi-solid mass of resin to form a plurality of discrete partially cured resin particles;
    (d) forming a shaped article from a mass of the partially cured particles; and
    (e) subjecting the thus formed shaped article to second curing conditions effective to activate said second curing agent and thereby fully curing the resin system to provide a synthetic shaped article simulating marble, granite or the like.

11. The method according to claim 10 wherein the thermosetting resin comprises an unsaturated polyester resin, and the first and second curing agents comprise free radical initiators.

12. The method according to claim 10 or 11 wherein the first curing agent is hydrogen peroxide or methyl ethyl ketone peroxide and the second curing agent is benzoyl peroxide.

13. The method according to claim 10 wherein said first curing agent is hydrogen peroxide having an activation temperature of less than about 50° C. and said step of subjecting the resin system to first curing conditions effective to activate said first curing agent comprises subjecting the resin system to ambient temperature at ambient pressure.

14. The method according to claim 13 wherein said second curing agent comprises benzoyl peroxide having an activation temperature of greater than about 70° C., and said step of subjecting the shaped article to second curing conditions effective to activate said second curing agent comprises heating the shaped article under pressure of at least about 50 psi and a temperature of at least about 70° C.

15. The method according to claim 10 including the step, after said step of subjecting the resin system to first curing conditions effective to activate the first curing agent and continuing during said comminuting step, of arresting further curing of the resin system to maintain the resin system in a partially cured state.

16. The method according to claim 15 wherein said arresting step comprises cooling the resin system to less than about 5° C.

17. The method according to claim 10 including the step, after the step of comminuting, of adding additional thermosetting resin to the plurality of discrete partially cured resin particles.

18. A method for producing a synthetic shaped article simulating marble, granite or the like, the method comprising:
   (a) providing a resin system which includes a thermosetting resin, a first curing agent and a second curing agent;
   (b) subjecting the resin system to a first temperature effective to activate only the first curing agent and thereby partially curing the resin system to form a semi-solid resin mass;
   (c) cooling the partially cured semi-solid resin mass to arrest further curing of the resin while comminuting the partially cured semi-solid mass of resin to form a plurality of discrete partially cured resin particles;
   (d) forming a shaped article from a mass of the partially cured particles; and
   (e) subjecting the thus formed shaped article to a second temperature effective to activate said second curing agent and thereby fully curing the resin system to provide a synthetic shaped article simulating marble, granite or the like.

19. The method according to claim 18 wherein said thermosetting resin comprises an unsaturated polyester resin, and said first and second curing agents comprise free radical initiators.

20. The method according to claim 18 or 19 wherein the first curing agent is hydrogen peroxide or methyl ethyl ketone peroxide and the second curing agent is benzoyl peroxide.

21. The method according to claim 18 wherein the first curing agent is hydrogen peroxide and said step of subjecting the resin system to a temperature effective to activate said first curing agent comprises subjecting the resin system to ambient temperature at ambient pressure.

22. The method according to claim 21 wherein the second curing agent comprises benzoyl peroxide, and said step of subjecting the shaped article to a second temperature effective to activate said second curing agent comprises molding the shaped article under pressure of at least about 50 psi and a temperature of greater than about 100° C.

23. The method according to claim 18, wherein said step of cooling the partially cured resin to arrest further curing, comprises cooling the resin system to less than about 5° C.

24. The method of claim 18 wherein the second temperature effective to activate said second curing agent is a temperature greater than about 100° C.

25. The method according to claim 18 wherein the thermosetting resin comprises an unsaturated polyester resin and the curing agent is hydrogen peroxide or methyl ethyl ketone peroxide.

26. A method for producing a synthetic shaped article simulating marble, granite or the like, the method comprising:
   (a) providing a resin system which includes a thermosetting resin and a curing agent;
   (b) subjecting the resin system to a first temperature effective to activate the curing agent and thereby partially curing the resin system to form a semi-solid resin mass;
   (c) cooling the partially cured semi-solid resin mass to arrest further curing of the resin while comminuting the partially cured semi-solid mass of resin to form a plurality of discrete partially cured resin particles;
   (d) forming a shaped article from a mass of the partially cured particles; and
   (e) heating the thus formed shaped article to a second temperature effective to reactivate the curing agent and thereby fully curing the resin system to provide a synthetic shaped article simulating marble, granite or the like.

27. The method according to claim 26 wherein the thermosetting resin comprises an unsaturated polyester resin and the curing agent is hydrogen peroxide or methyl ethyl ketone peroxide.

28. The method according the claim 26 wherein the step of subjecting the resin system to the first temperature effective to activate the curing agent comprises subjecting the resin system to ambient temperature and ambient pressure.

29. The method according to claim 26 wherein said arresting step comprises cooling the resin system to less than about 5° C.

30. The method according to claim 26 including the step, after the step of comminuting, of adding additional thermosetting resin to the plurality of discrete partially cured resin particles.

* * * * *